United States Patent

[15] 3,644,031

Bennett [45] Feb. 22, 1972

[54] MEANS FOR ALTERNATELY INDEXING TWO SLIDE TRAYS WHICH DIFFER IN RESPECTIVE DISTANCES BETWEEN ADJACENT SLIDE-RECEIVING SPACES

[72] Inventor: Frank P. Bennett, Northbrook, Ill.
[73] Assignee: GAF Corporation, New York, N.Y.
[22] Filed: Nov. 20, 1968
[21] Appl. No.: 777,280

Related U.S. Application Data

[63] Continuation-in-part of Ser. No. 739,353, June 24, 1968.

[52] U.S. Cl. .............................353/117, 74/332, 353/104
[51] Int. Cl. .................................................G03b 23/06
[58] Field of Search..............353/103, 104, 107, 108, 111, 353/117, 115, 116, 114; 74/332

[56] References Cited

UNITED STATES PATENTS 3,296,727  1/1967  Liguori ....................................353/117
Re26,619  7/1969  Hall ........................................353/116

Primary Examiner—Leonard Forman
Assistant Examiner—Steven L. Stephan
Attorney—McDougall, Hush & Scott

[57] ABSTRACT

A slide projector is adapted for alternately receiving a "100-slide" tray and an "80-slide" tray. These trays have the same outside diameter. The "100-slide" tray is provided with 100 indexing teeth and the "80-slide" tray is provided with 80 indexing teeth, the teeth on the latter being shaped and spaced differently than the teeth on the former. The projector includes a single indexing gear having 12 teeth. During each slide-changing cycle, this indexing gear is rotated through 30°. Each tooth on the indexing gear engages the teeth on the "80-slide" tray at the distal end of the former such that a 30° rotational movement of the indexing gear rotates the "80-slide" tray 4.5°. Each tooth on the indexing gear engages the teeth of the "100-slide" tray at a location inwardly of the distal end of the former so that 30° of rotational movement of the indexing gear serves to rotate or advance the "100-slide" tray 3.6°.

1 Claim, 16 Drawing Figures

PATENTED FEB 22 1972 3,644,031

INVENTOR
FRANK P. BENNETT
BY
ATT'YS.

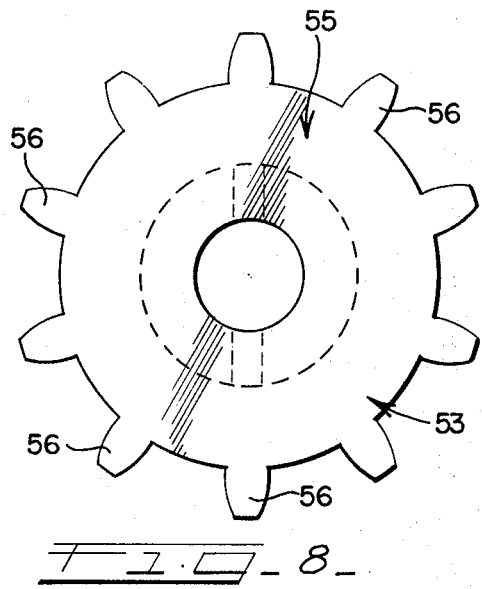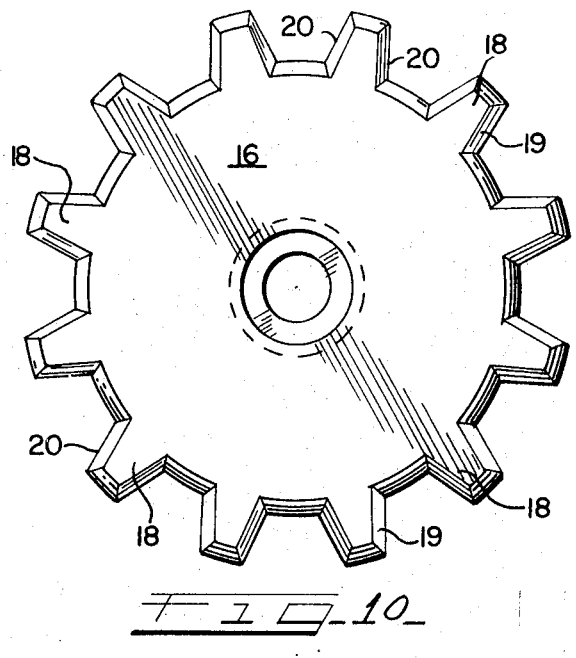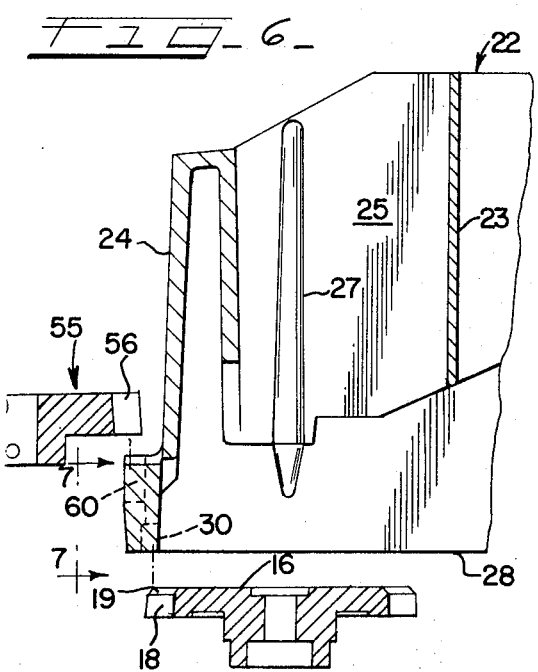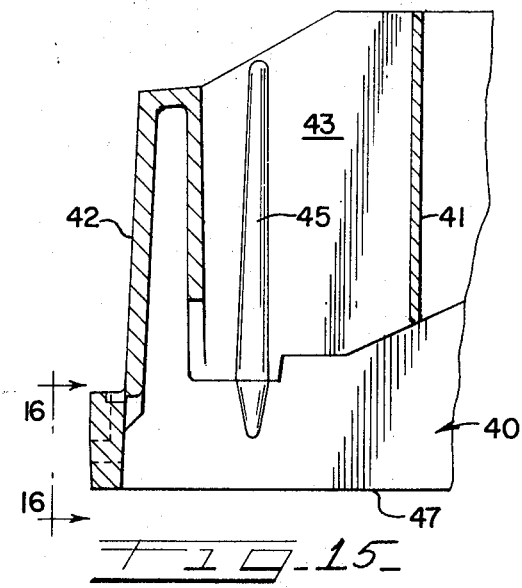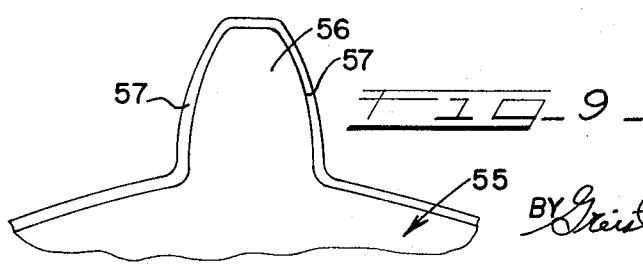

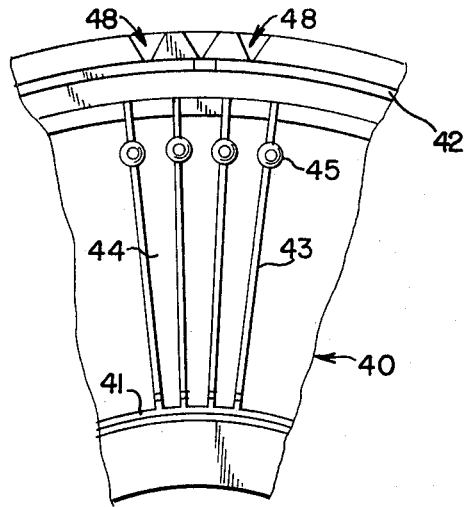
Fig. 11.
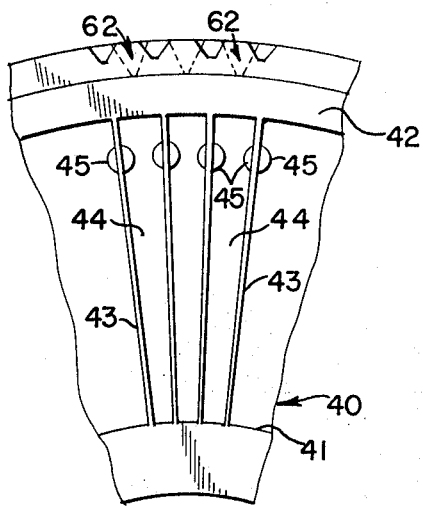
Fig. 12.
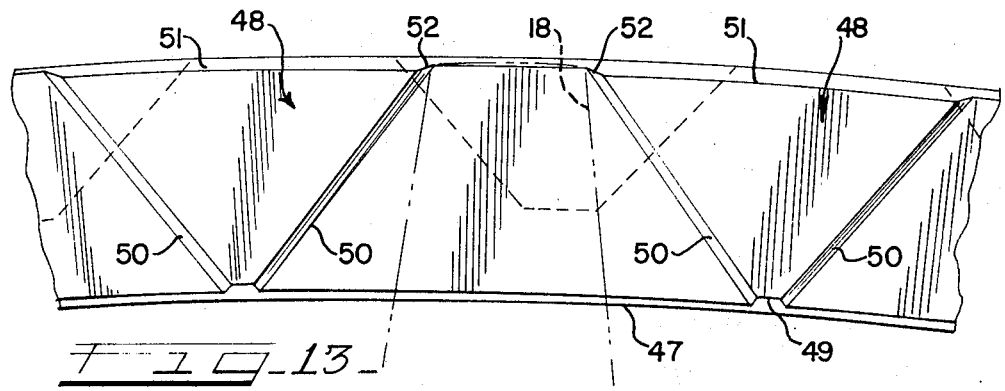
Fig. 13.
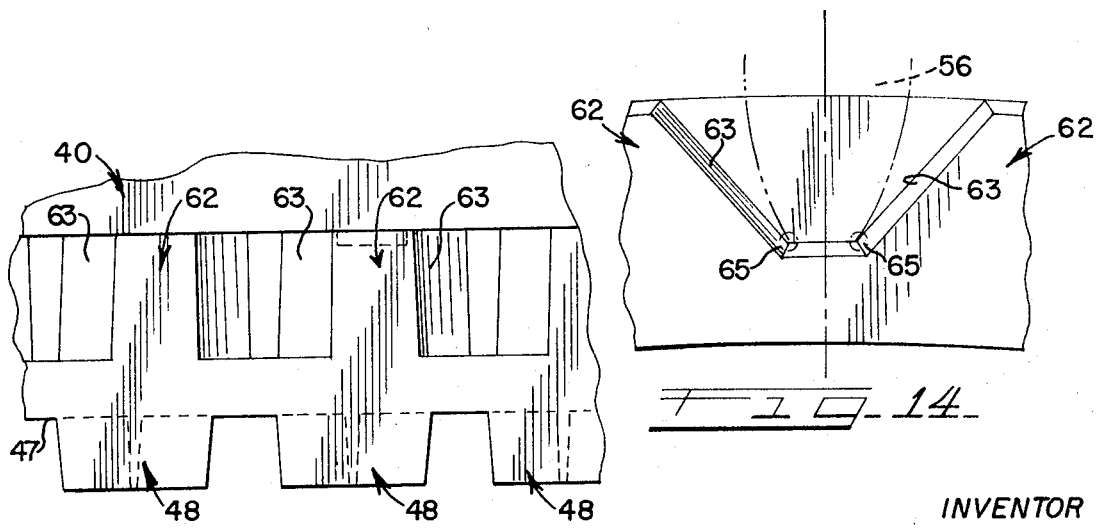
Fig. 16.
Fig. 14.
INVENTOR
FRANK P. BENNETT
ATT'YS.

3,644,031

MEANS FOR ALTERNATELY INDEXING TWO SLIDE TRAYS WHICH DIFFER IN RESPECTIVE DISTANCES BETWEEN ADJACENT SLIDE-RECEIVING SPACES

BACKGROUND OF THE INVENTION

This application is a continuation-in-part of the pending application of Frank P. Bennett, Ser. No. 739,353, filed June 24, 1968.

As is known to those skilled in the art, photographic slide mounts are made of different materials, such as cardboard, metal, glass and plastic. Such slide mounts have the same height and width, but differ in thickness depending on the particular material used to form the mount. Slide trays of the type having septums or partitions defining individual slide-receiving spaces are usually dimensioned or adapted to accommodate a particular form or type of slide. That is, a particular slide tray will have its spaces dimensioned to receive only slides with cardboard mounts, whereas another tray will have its spaces dimensioned to receive only glass-mounted slides, for example. Due to the difference in thicknesses of the slides, the widths of the respective spaces in such trays will be different and therefore the distance or interval between the adjacent spaces of respective trays will also differ. For example, a tray adapted to receive slides having cardboard mounts will be indexed a certain distance which will be represented by the difference between the centers of the adjacent slide-receiving spaces. A tray adapted to receive slides of the type having glass mounts will be indexed a somewhat greater distance, this distance being represented by the distance between the centers of adjacent slide-receiving spaces.

It is desirable to adapt a slide projector for alternately accommodating at least two slide trays which differ in respective distances between their adjacent slide-receiving spaces or, stated another way, which differ in the sense they must be advanced or indexed different distances for presenting a successive slide to the position occupied by a preceding slide. Separate indexing mechanism of course may be provided for accommodating the different trays, but this complicates projector construction. The present invention provides a single indexing member or gear which cooperates with special teeth on the two trays whereby each tray is indexed the proper distance for the same amount of movement of the indexing gear.

SUMMARY OF THE INVENTION

The present invention may be summarized as relating to a unique gearing arrangement whereby a single indexing gear is alternately engageable with teeth on two trays which differ in respective distances between their slide-receiving spaces, whereby movement of the indexing gear through a certain predetermined amount of rotation results in movement of one tray through a certain amount and movement of the other tray through a different amount of movement.

A primary object of the present invention is the provision of new and improved indexing means adapting a slide projection for alternately accommodating trays which differ in respective distances between their adjacent slide-receiving spaces or, stated another way, which differ in the sense they must be indexed different distances to present a successive slide to the location formerly occupied by the preceding slide.

Another object of the present invention is the provision of new and improved indexing means according to the foregoing object, wherein such indexing means includes a unique gearing arrangement.

Still another object of the present invention is the provision of the aforementioned gearing arrangement whereby respective formations of teeth on two trays cooperated with a single indexing gear such that distal ends of teeth on the later engage the teeth on one of the trays and intermediate points on the teeth of the same indexing gear engage the teeth on the other tray.

These and other objects and advantages of the invention will become apparent from the following specification disclosing a preferred embodiment shown in the accompanying drawings.

DESCRIPTION OF THE DRAWINGS

FIG. 6 is a fragmentary section taken through the "100-slide" tray, which section also shows two indexing gears for alternately engaging the two series of teeth on the "100-slide" tray, one indexing gear being associated with the slide projector and other indexing gear being associated with a random selection attachment for the projector;

FIG. 8 is an enlarged, top plan view of an indexing gear forming part of a random selection attachment for the projector;

FIG. 9 is an enlarged, fragmentary top plan view of one of the teeth shown in FIG. 8;

FIG. 10 is an enlarged top plan view of the indexing gear associated with the slide projector;

FIG. 11 is an enlarged, fragmentary bottom plan view of an "80-slide" tray;

FIG. 12 is a fragmentary top plan view of the "80-slide" tray;

FIG. 13 is an enlarged, fragmentary bottom plan view primarily showing a first series of indexing teeth on the "80-slide" tray;

FIG. 14 is a fragmentary top plan view primarily showing another series of indexing teeth on the "80-slide" tray;

FIG. 15 is a fragmentary section taken through the "80-slide" tray; and

FIG. 16 IS AN ENLARGED VIEW TAKEN ALONG THE LINE 16—16 of FIG. 15.

DESCRIPTION OF A PREFERRED EMBODIMENT

Figure 1:
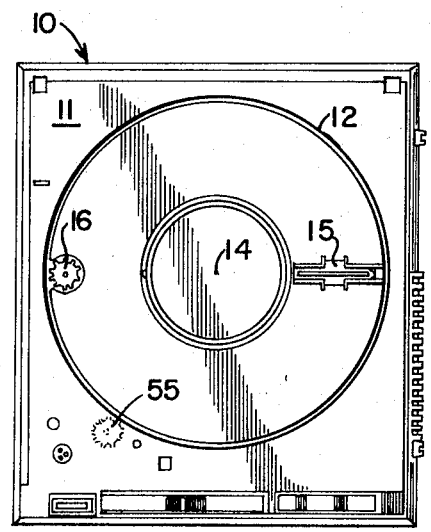
FIG. 1 is a top plan view of a slide projector having an indexing gear and supporting means for alternately accommodating a "100-slide" tray and "80-slide" tray, which trays are circular and have the same outside diameter.
Figure 7:
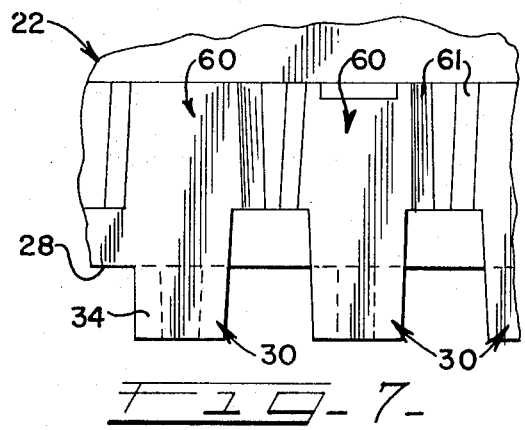
FIG. 7 is an enlarged view taken along the line 7—7 of FIG. 6.

Referring to FIG. 1, a slide projector 10 has a flat top wall 11 with an annular raceway 12 for rotatably supporting a circular slide tray in horizontally disposed relation. It will be understood such tray rotates about a vertical axis indicated at 14. The top wall of the projector housing includes a slot 15 defining an opening into the slide projection gate. An indexing gear 16 for advancing the trays to be described herein is rotatably mounted in diametrically disposed relation with the slot 15 and within the confines of the raceway 12. Such gear is rotated or indexed through a predetermined arcuate amount for each complete cycle of the slide-changing mechanism (not shown).

It will be understood the slide projector may be of any suitable construction. The particular projector illustrated herein is of the type disclosed and claimed in the copending application of Walter J. Hall, Ser. No. 684,202, filed Nov. 20, 1967 now U.S. Pat. No. 3,499,708.

Turning now to FIG. 10, the embodiment of the gear 16 shown for purposes of illustration will be seen to include 12 teeth 18. Each tooth has beveled upper surfaces 19 (FIG. 6) to facilitate engagement by the teeth on the tray as will become apparent herein. Each of the teeth 18 has inclined, planar sidewalls 20. According to the present embodiment of the invention, each time the slide-changing mechanism is actuated through a complete cycle (returning a slide from the projection gate to the tray and presenting a successive slide to the projection gate) the gear is rotated or indexed through an arcuate amount equal to 360° divided by the number of teeth, i.e., 30°.

Figure 2:
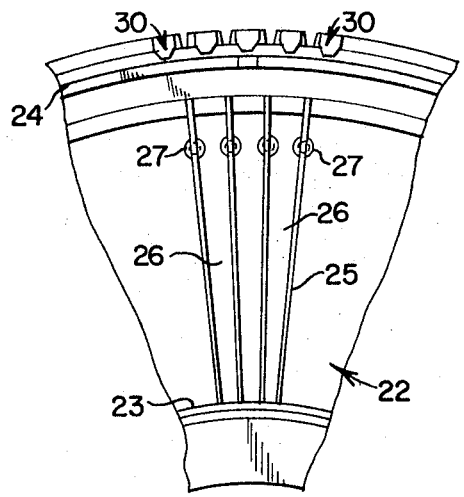
FIG. 2 is an enlarged, fragmentary bottom plan view of the "100-slide" tray.
Figure 3:
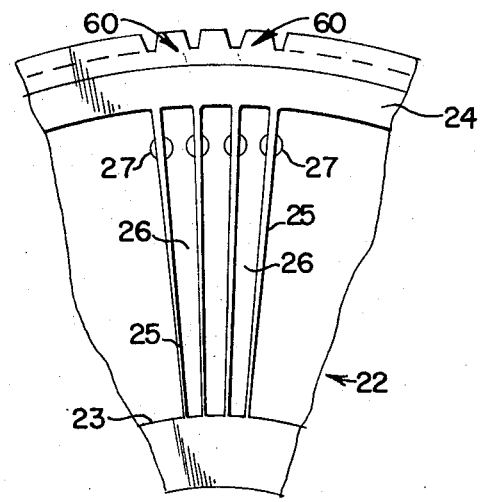
FIG. 3 is a fragmentary top plan view of the "100-slide" tray.

A circular slide tray, generally designated 22 (FIGS. 2 and 3) includes inner and outer concentric, annular walls 23 and 24, respectively, with a plurality of radially extending partitions or septums 25 extending therebetween for defining 100 slide-receiving spaces 26. Each of the partitions 25 has axially extending ribs 27. The distance between adjacent ribs is approximately the same as the distance between the partitions at the innermost portions of the latter, such distance being approximately the same as the thickness of a photographic slide with a cardboard mount. According to the present embodiment, the slide-receiving spaces 26 are open at their tops and bottoms. Suitable slide-retaining means (not shown) yieldably engage the slides for releasably holding the same in respective slide-receiving spaces. The projector 10 includes a slide release mechanism (not shown) for allowing the slides to drop one at a time from the spaces 26 into the projection gate. The slide-changing means within the projector includes lifting means for returning the slides to the tray. For a more complete understanding of the slide-changing mechanism, reference may be had to the aforementioned Hall application.

Figure 4:
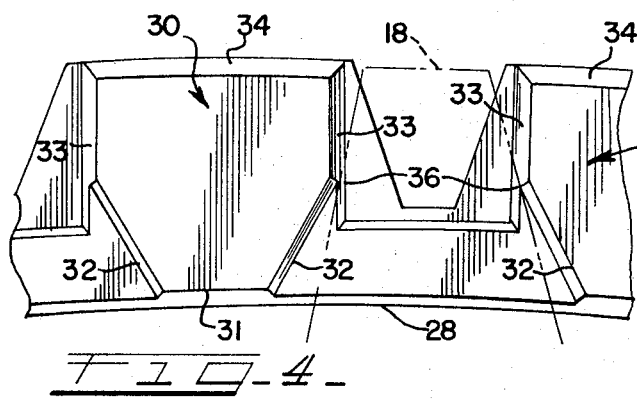
FIG. 4 is an enlarged, fragmentary bottom plan view primarily showing a first series of teeth on the "100-slide" tray.

Referring particularly to FIGS. 4 and 6, the tray 22 includes a lowermost rim 28 which is received in the raceway 12 of the projector thereby slidably mounting the tray for rotation about its central axis. A continuous series of teeth, each generally designated 30, is formed along this rim for being engaged by the teeth on the indexing gear 16. Each tooth 30 has an inner face 31, a pair of inclined faces 32 (which are slightly beveled), a pair of side faces 33 (also slightly beveled) and an outer beveled face 34. Each tooth 30 is symmetrical with respect to a radius of the circular tray 22.

According to the present embodiment shown for purposes of illustration, the "100-slide" tray 22 includes 100 of the teeth 30. Each of the teeth 18 on the indexing gear will extend into the space between the teeth 30 and will be engaged by the latter at the corner formations 36, each of these formations being defined by the juncture between faces 32 and 33. As noted in FIG. 4, each, of the teeth 18 is engaged radially inwardly of the distal end thereof and at a location approximately midway along the radial extent of the tooth. The various parts are dimensioned such that rotation of the indexing gear through 30° will result in rotation of the tray 22 through 3.6°, this last figure being the result of 360° divided by the number of spaces 26 in the tray 22. Such movement of the tray 22 will index the latter for presenting a successive slide-receiving space over the projection gate defined by the slot 15.

Turning to FIGS. 11 and 12, another circular slide tray, generally designated 40, to be used alternately with the tray 22, has concentric, inner and outer annular walls 41 and 42, respectively. A plurality of radially extending partitions or septums 43 extend between such walls for defining slide-receiving spaces 44. According to the embodiment shown for purposes of illustration, the tray 40 includes 80 slide-receiving spaces for receiving slides with glass mounts. Each partition 43 includes an axially extending rib 45, the distance between adjacent ribs being substantially the same as the distance between the partitions 43 at the innermost ends thereof. Suitable spring-retaining means (not shown) yieldably engage marginal surfaces of the slides for releasably holding the same in the spaces of the tray 40.

As the tray 40 is to be used alternately with the tray 22, the trays have the same outside diameter, which diameter is approximately the same as the diameter of the raceway 12. Since this tray has 20 less spaces than the "100-slide" tray, this necessarily means that the center-to-center distance between adjacent slide-receiving spaces is greater in the tray 40 than in the tray 22.

The tray 40 (FIG. 15) includes a lower rim 47 which is slidably received in the raceway 12 thereby to support the tray 40 for rotation about its central axis. A continuous series of teeth, each generally designated 48 (FIG. 13), is formed along the rim 47 for being engaged by the teeth 18 on the indexing gear 16. Each tooth 48 includes an inner face 49, a pair of planar inclined faces 50 (which are slightly beveled) and an outer face 51. According to the present embodiment, there are 80 of the teeth 48.

As will be apparent from FIG. 13, each of the teeth 18 on the indexing gear 16 is received within the spaced defined by an adjacent pair of teeth 48. The distal end of each tooth 18 is engaged by outermost corner formations 52. When the tooth 18 is rotated through 30° during a slide-changing cycle, the slide tray 40 is rotated through 4.5°, this latter figure being the result of 360° divided by the number of slide-receiving spaces 44. This amount of indexing movement of the tray 40 will present the successive slide-receiving space over the projection gate.

Accordingly, it will be seen that a 30° amount of rotation of the indexing gear 16 will index or advance the "100-slide" tray 3.6° and will advance or index the "80-slide" tray 4.5°. This is made possible since the distal end of each tooth 18 engages the teeth 48 whereas each tooth 18 engages the teeth 30 at points or locations on the tooth 18 radially inwardly of such distal end. For a given amount of rotation of the gear 16, the distal ends of the teeth 18 of course move through a greater arc than points disposed radially inwardly of such distal ends.

The slide projector 10 shown for purposes of illustration is adapted to receive a random selection attachment, this attachment being disclosed and claimed in the aforesaid application of Frank P. Bennett. Such a random selection attachment includes its own drive system and indexing gear for rotating a tray to present at the projection gate any of the slide-receiving spaces selected at random.

The indexing gear associated with this attachment is illustrated in FIGS. 1, 6, 8 and 9 and generally designated 55. As noted in FIG. 8, the gear 55 includes 10 gear teeth 56, each tooth being beveled (FIG. 9) and having arcuate or curved side faces 57.

Figure 5:
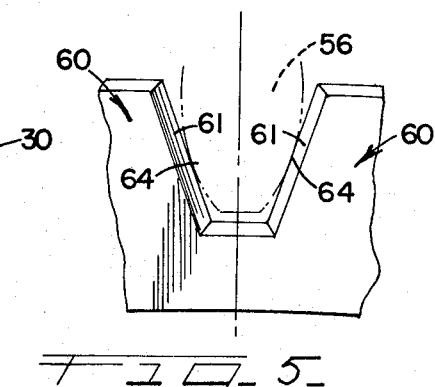
FIG. 5 is a fragmentary top plan view primarily showing a second series of teeth on the "100-slide" tray.

To adapt the tray 22 for being rotated or indexed by the gear 55, the former is provided with a continuous series of teeth 60 which total 100 in number. As noted in FIG. 5, each tooth 60 is beveled to facilitate engagement by the gear 55; each tooth 60 has inclined planar side faces 61.

The slide tray 40 is also adapted to be indexed or rotated by the gear 55. To this end, the tray 40 is provided with a continuous series of 80 teeth 62. As seen in FIG. 14, each tooth 62 has beveled faces to facilitate engagement by the gear 55, the side faces 63 being inclined and being planar. Contrasting the teeth 60 and 62 (FIGS. 5 and 14), it is noted that the teeth are similar except the faces of the teeth 62 have a greater inclination than the corresponding faces of the teeth 61. Or stated another way, the faces 63 define a greater angle than the faces 61.

EAch of the teeth 56 on the gear 55 is received in the valleys or open spaces between the teeth 60, engaging the side faces 61 of such teeth at points approximately midway along the radial extent of the teeth 56. This engagement between the gear teeth 56 and the tray teeth 60 is indicated by the contact points 64 in FIG. 5. When the "80-slide" tray 40 is used, only the distal ends of the teeth 56 engage the teeth 62, the points of engagement being designated at 65 in FIG. 14.

According to the present embodiment, when the gear 55 is rotated through a predetermined arcuate amount, i.e., 36°, this being the result of 360° divided by the number of teeth 56, the "100-slide" tray 22 is rotated through 3.6° and the "80-slide" tray 40 is rotated through 4.5°. This greater amount of rotation of the tray 40 is brought about by reason of the fact the teeth 62 thereon are engaged at the distal ends of the gear teeth 56 which travel through a greater arc than do the portions of the teeth which establish the contact points 64 with the teeth 60 on the tray 22.

It is understood the present invention is not to be limited for use with any of the particular slide projectors or trays mentioned or referred to herein. It should be apparent the present invention is applicable not only to circular slide trays but also to elongated or boxlike slide trays as well. Further, those skilled in the art will realize the number of indexing teeth on a tray need not be equal to the number of slide-receiving spaces in such tray. The relationship between the number of teeth on the trays and on the indexing gear may vary so long as the teeth are constructed according to the present invention such that a given amount of movement of the gear causes movement of each tray in an amount necessary to locate a successive slide-receiving space at the projection gate. However, if the number of tray teeth differ from the number of slide-receiving spaces, suitable means, such as indicia, must be provided to establish the initial position of each tray with respect to the projector, i.e., with a slide-receiving space in alignment with the projection gate. Of course, the invention is also applicable in a system where only the indexing means is provided. The dual indexing means provided by the projector 10 and the random selection attachment mentioned herein have been disclosed for better illustration of the invention. The gear teeth 56 and the tray teeth 60 and 62 may be considered as a modification of the invention represented by the gear teeth 18 and the tray teeth 30 and 48.

I claim:
1. In combination:
  a. a slide projector having a horizontally disposed, planar slide tray receiving surface, which is annular in shape and adapted to receive at least two alternative circular slide trays having unequal slide capacity, but substantially equal exterior dimensions;
  b. said projector supporting an indexing mechanism adjacent said surface, which mechanism includes at least one indexing gear having a plurality of teeth and means for intermittently rotating the same through a predetermined arcuate extent to establish an indexing cycle, said gear being mounted for such movement and about an axis perpendicular to said surface;
  c. A first circular slide tray having an annular supporting rim and adapted to be slidably supported in a horizontal position on said projector with such rim in adjacent concentric relationship with said surface;
  d. said first tray having a plurality of equally spaced, radially extending partitions defining a corresponding number of spaces each adapted to receive a slide of predetermined thickness;
  e. said first tray having a continuous annular series of first spaced indexing projections radially disposed interiorly of said rim, said projections comprising a pair of faces converging toward the center of the tray and defining therebetween at the outermost ends of the inclined faces corner formations arranged and shaped to be successively engaged by said indexing gear at the distal end of the teeth of said gear such that rotation of the latter through said predetermined arcuate extent advances said first tray about its central axis in the same rotational direction as said gear and through an arc represented by the center-to-center spacing of adjacent slide-receiving spaces of said first tray;
  f. a second circular slide tray having substantially the same exterior dimensions as said first tray and having an annular rim of substantially the same diameter as the rim of said first tray, which second tray is adapted to be slidably supported in a horizontal position on said projector, alternately with said first tray, with the rim of the second tray in adjacent concentric relationship with said surface;
  g. said second tray having a plurality of equally spaced, radially extending partitions defining a corresponding number of spaces each adapted to receive a slide of a predetermined thickness which is less than the thickness of said first-mentioned slide, the number of spaces in said second tray being greater than the number of spaces in said first tray; and
  h. said second tray having a continuous annular series of second spaced indexing projections radially disposed interiorly of said rim, said projections comprising a pair of radial side faces extending inwardly from the outermost ends of the projections to a midpoint thereof and a second pair of faces extending from the midpoints and converging toward the center of the tray, the midpoint junctures of the sides and inclined faces defining corner formations arranged and shaped to be successively engaged by said indexing gear at a predetermined point on the teeth of said gear which is radially inward of their distal end such that rotation of said gear through said predetermined arcuate extent advances said second tray about its central axis in the same rotational direction as said gear and through an arc represented by the center-to-center spacing of adjacent slide receiving spaces of said second tray.

* * * * *